(12) United States Patent
Vasudev et al.

(10) Patent No.: US 12,088,223 B2
(45) Date of Patent: Sep. 10, 2024

(54) DQ0 AND INVERSE DQ0 TRANSFORMATION FOR THREE-PHASE INVERTER, MOTOR AND DRIVE DESIGN

(71) Applicant: Tektronix, Inc., Beaverton, OR (US)

(72) Inventors: U N Vasudev, Bengaluru (IN); Krishna N H Sri, Bengaluru (IN); Vempati L. Bharghavi, Bengaluru (IN); Omer Sheikh, High Wycombe (GB)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 16/921,865

(22) Filed: Jul. 6, 2020

(65) Prior Publication Data

US 2021/0013818 A1 Jan. 14, 2021

(30) Foreign Application Priority Data

Jul. 8, 2019 (IN) .............................. 201921027221

(51) Int. Cl.
*H02P 21/00* (2016.01)
*H02P 27/06* (2006.01)

(52) U.S. Cl.
CPC .......... *H02P 21/0003* (2013.01); *H02P 27/06* (2013.01)

(58) Field of Classification Search
CPC .............................. H02P 21/0003; H02P 27/06
See application file for complete search history.

(56) References Cited

U.S. PATENT DOCUMENTS

| | | | |
|---|---|---|---|
| 8,248,038 B2* | 8/2012 | Padiyar | H02H 7/06 322/20 |
| 2004/0189565 A1* | 9/2004 | Someya | G09G 3/3611 345/87 |
| 2011/0140424 A1* | 6/2011 | Edenfeld | H02P 29/662 290/44 |
| 2011/0245990 A1* | 10/2011 | Rasmussen | H02J 3/40 700/298 |
| 2014/0125258 A1* | 5/2014 | Fulton | H02P 29/67 322/23 |
| 2016/0126869 A1* | 5/2016 | Simms | H02J 3/18 318/376 |
| 2017/0102425 A1* | 4/2017 | Hao | G01R 31/346 |

FOREIGN PATENT DOCUMENTS

WO 2018020545 2/2018

* cited by examiner

*Primary Examiner* — Zoheb S Imtiaz
(74) *Attorney, Agent, or Firm* — Miller Nash LLP; Andrew J. Harrington

(57) ABSTRACT

A test and measurement device includes an interface configured to acquire analog three-phase signals from a device under test, and a processor programmed to execute instructions that cause the processor to perform a direct-quadrature-zero, DQ0, transformation and produce DQ0 signals based on the analog three-phase signals, and measure performance of the device under test based on the DQ0 signals. A method includes acquiring three-phase signals from a device under test, performing a direct-quadrature-zero, DQ0, transformation on the three-phase signals to produce DQ0 signals, and using the DQ0 signals to measure performance of the device under test.

20 Claims, 17 Drawing Sheets

DQ0 AND INVERSE DQ0 TRANSFORMATION FOR THREE-PHASE INVERTER, MOTOR AND DRIVE DESIGN

RELATED APPLICATIONS

This application is a continuation of, and claims priority to, Indian Provisional Patent Application No. 201921027221, filed Jul. 8, 2019.

FIELD

This disclosure relates to test and measurement devices, more particularly to test and measurement devices for motors and synchronous machines.

BACKGROUND

The behavior of three-phase synchronous machines is usually described by rotating voltage and current equations, such as the rotating voltage equations (1)-(3) below, where R, S, and T are three-phase AC signals and $V_g$ is the corresponding gain.

$$V_R = V_g * \cos(w_{in} * t) \quad (1)$$

$$V_S = V_g * \cos(w_{in} * t - 2*pi/3) \quad (2)$$

$$V_T = V_g * \cos(w_{in} * t - 4*pi/3); \quad (3)$$

where $w_{in}$ is 2*pi*f of the input R, S, T three-phase signals. The 'f' is the nominal frequency. The user can configure 'f' as line frequency or any custom frequency of the motor that is a value of interest.

The voltages (V) and currents (I) at the AC interface are usually separated, typically being 120 degrees out of phase. These V and I components are time-varying, meaning there is no representation of steady state operation point.

Direct-quadrature-zero (DQ0) transformations typically rotate the reference frames of AC waveforms to convert them to DC signals. This allows simplified calculations on the DC signals before performing the inverse transform to recover the actual three-phase AC results. The DQ0 transforms also simplify the analysis of the performance of the synchronous machines.

Generally, AC signals are real world signals, but converting them to DC helps to get an abstract representation of the direct quadrature transform. The DQ0 assists in letting the user to know what controller sees. This information helps the user to know more about what the controller is doing and allows the user to better tune the controller design.

Generally, the DQ0 frames are preferred for synchronous machines and alpha-beta zero transform is preferred for induction machines.

In current solutions, users depend on field-programmable gate array (FPGA) based hardware to handle sensor data to get the DQ0 information and then check the control information through multiple iterations. This solution involves a complex and custom process. The user has to try to probe and/or measure the D-Q-O signals, which is not practically possible. Instead, a typical solution provides an external stimulus to a controller to simulate the controller input signals and the analog-digital controller (ADC) outputs as the DQ0 signals.

Embodiments of the disclosed apparatus and methods address shortcomings in the prior art.

DETAILED DESCRIPTION

In current solutions, users depend on field-programmable gate array (FPGA) based hardware to handle sensor data to get the DQ0 information and then check the control information through multiple iterations. This solution involves a complex and custom process.

The user has to try to probe and/or measure the D-Q-O signals, which is not practically possible. The user has to access signals received at a motor control microprocessor. This generally involves embedded control software, sensors and a field-programmable gate array (FPGA). Instead, a typical solution provides an external stimulus to the motor controller to simulate the controller input signals, and capturing the analog-digital controller (ADC) outputs as the DQ0 signals.

Embodiments here receive the actual three-phase signals that come into the controller to perform the DQ0 transformation. The users can use probe connectors to probe the three-phase voltage and current signals, and perform the transformation to DQ0 without sensors. The controller executes instructions that use these direct signals.

One should note that the term controller as used here includes any type of processing element that can execute instructions, including controllers, microcontrollers, processors, also referred to a microprocessors, digital signal processors, application specific integrated circuits (ASICs), etc.

Figure 1:
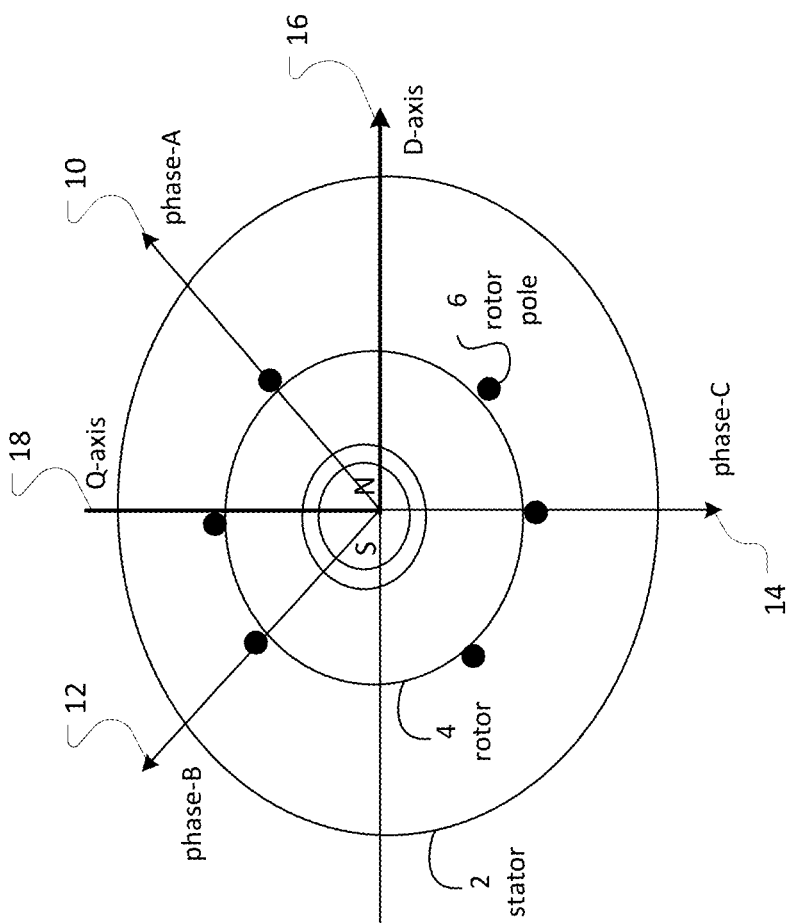
FIG. 1 shows a cross-sectional functional diagram of rotor and stator axis relationship.

FIG. 1 shows a cross-sectional functional diagram of rotor and stator axis relationship in, for example, a motor. The outer ring represents the stator 2. The inner ring represents the rotor 4. The dots shown distributed around the rotor 4 represent the rotor poles 6. A permanent magnet (N-S) may be located at the center. The DQ reference frame of the D-axis 16 and Q-axis 18 is fixed to the rotor of the motor. The axis of the field winding in the direction of the DC field is called the rotor direct axis, or the d-axis. The axis that is 90 degrees later than the d-axis is the quadrature axis (q-axis). Axes 10, 12, 14 represent the axes of the three-phase voltage and/or current signals, e.g. R, S, T. The transformation uses the three-phase signals shown in FIG. 1 according to the frame equations below. The below matrix equation (4) is applicable when q-axis and a-axis align at time t=0 and q-axis makes an angle θ with a-axis at any time t.

$$\begin{bmatrix} Q \\ D \\ 0 \end{bmatrix} = K \begin{bmatrix} \cos(\theta) & \cos(\theta - 2\pi/3) & \cos(\theta + 2\pi/3) \\ \sin(\theta) & \sin(\theta - 2\pi/3) & \sin(\theta + 2\pi/3) \\ \frac{1}{2} & \frac{1}{2} & \frac{1}{2} \end{bmatrix} \begin{bmatrix} R(t) \\ S(t) \\ T(t) \end{bmatrix}. \quad (4)$$

When d-axis and a-axis align at time t=0 and d-axis makes an angle θ with a-axis at time t, the following matrix equation (5) is applicable.

The K value can be ⅔ or √(⅔).

When K is ⅔ the matrix equation will have third row as ½. So '0' becomes ⅔*½*(R+S+T).

When K is √(⅔) the matrix equation will have third row as 1/√2. So '0' becomes √(⅔)*1/√2*(R+S+T).

$$\begin{bmatrix} D \\ Q \\ 0 \end{bmatrix} = K \begin{bmatrix} \cos(\theta) & \cos(\theta - 2\pi/3) & \cos(\theta + 2\pi/3) \\ -\sin(\theta) & -\sin(\theta - 2\pi/3) & -\sin(\theta + 2\pi/3) \\ \frac{1}{2} & \frac{1}{2} & \frac{1}{2} \end{bmatrix} \begin{bmatrix} R(t) \\ S(t) \\ T(t) \end{bmatrix}. \quad (5)$$

The user can configure which method to use based on the motor controller design. In one embodiment, the system will allow the user to select whether to use the equation aligning with the q-axis or the d-axis as the measurement configuration.

The θ in the matrix and θ of the R, S, T can be different based on the method we use to compute theta function.

The angle, θ, is the angle between the rotating d-q reference frame and the a-axis, where the a-axis is fixed on the stator frame and is defined by the location of the phase-a winding. The angle θ at time t may be calculated by equation (6):

$$\theta = (0 \text{ to } T) \int w(t) dt + \theta(0), \quad (6)$$

where ω is the rotational speed of the d-q coordinate axis, and in the embodiments here used as synchronous speed.

This transformation will allow the users to operate on the stator circuit voltage equation and transform it to the q-d-0 coordinates.

The θ at time t in the matrix equations can be computed using different methods. A first approach is referred to as the Three-Phase PLL method. The PLL is generally embedded in the controller circuit of the three-phase motor. This method emulates a hardware PLL of the controller circuit using a software PLL to adjust the Phase shift and delays introduced from the filters. The phase-adjusted θ is obtained by implementation of a three-phase phase locked loop. If PLL is already implemented in motor controller circuit hardware, then acquired three-phase signals has the effect of this. The user can choose to apply software PLL, so that one can perform in the measurement flow and replicate a hardware PLL.

The PLL takes input as one of the transformed 'd(t)' or 'q(t)' values. This is configurable in the measurement. The PLL output gives corrected θ with respect to 'd' or 'q' axis. This axis is configurable in the measurement as source input.

The adjusted θ, which is the PLL output, is used back in the matrix equation and this will be different from $\theta_{in}$ of the three-phase RST signals. This adjustment process continues until all the samples of RST signals are processed, which regulates one of the configured 'd' or 'q' given as reference input to PLL.

Another approach is referred to as the Standard method. The typical choice for θ is ωt where ω is 2*pi*f. This represents the fixed rotor angle of the synchronous machines. This is called as freewheeling theta method. In this method θ of the matrix and $\theta_{in}$ of the three-phase RST signals are same. It is more of an ideal condition since θ is not being adjusted from PLL or any feedback method.

This method has a user configurable θ(t). The user can give θ function of time as an additional qualifier source to the measurement as external or explicit clock. The measurement can use this for extracting the θ value for the matrix. In this method, θ of the matrix is configured by the user and this is different from $\theta_{in}$ of the three-phase RST signals.

In a third method, referred to as the configurable θ(t) function, the user can provide as theta function and this is an additional qualifier source to measurement and that can be used in the matrix equation. This theta waveform, which is equivalent to the PLL output, has to be synchronized with the three-phase RST signals. The user can then use this theta value and compute DQ0 at every sample point.

In the above methods the 'f' represents the fundamental frequency of the three phase signals. However, users can configure 'f' as the line frequency or any custom frequency value of interest.

The angle θ(t) is built based on input three-phase RST waveforms and the θ(t) used in the matrix resets to zero at every 2π radians, so that it becomes like a ramp output. In the PLL method one can regulate direct or quadrature axis to zero, unlike in the freewheeling method above. The three-phase PLL method provides better frequency synchronization between the three-phase RST and DQ0 signals. The standard method is simplest of all because it relies on the hardware implementation for synchronization.

Further, under balanced conditions, the value along the Z-axis is zero, and therefore produces no flux at all. This allows the d-q transformation to simplify to equation (7):

$$\begin{bmatrix} Q \\ D \\ 0 \end{bmatrix} = K \begin{bmatrix} \cos(\theta) & \cos(\theta - 2\pi/3) & \cos(\theta + 2\pi/3) \\ \sin(\theta) & \sin(\theta - 2\pi/3) & \sin(\theta + 2\pi/3) \\ 0 & 0 & 0 \end{bmatrix} \begin{bmatrix} R \\ S \\ T \end{bmatrix}. \quad (7)$$

In this equation (7), referred to as the DQ0 or forward equation, K is a constant. Typical choices for the value of K are ⅔, and √(⅔). This causes the magnitude of the D-Q quantities to be equal to that of the three-phase quantities.

For example, interpretation of K may differ. When K equals ⅔, this means that the sinusoidal signal is balanced, and √(⅔) means that it is a power invariant system. In the embodiments here, the DQ0 transformation takes as its inputs the three-phase (R-S-T) time-domain voltages and currents from the motor drive input.

One can perform the inverse DQ0 transformation, also referred to as the RST or backwards equation (8). The inverse transformation uses the DQ0 signals computed by the motor controller as its inputs to get the R-S-T values, as shown below:

$$\begin{bmatrix} R \\ S \\ T \end{bmatrix} = K \begin{bmatrix} \cos\theta & \sin\theta & 1 \\ \cos(\theta(t) - 2\pi/3) & \sin(\theta(t) - 2\pi/3) & 1 \\ \cos(\theta(t) + 2\pi/3) & \sin(\theta(t) + 2\pi/3) & 1 \end{bmatrix} \begin{bmatrix} Q \\ D \\ 0 \end{bmatrix}. \quad (8)$$

Figure 2:
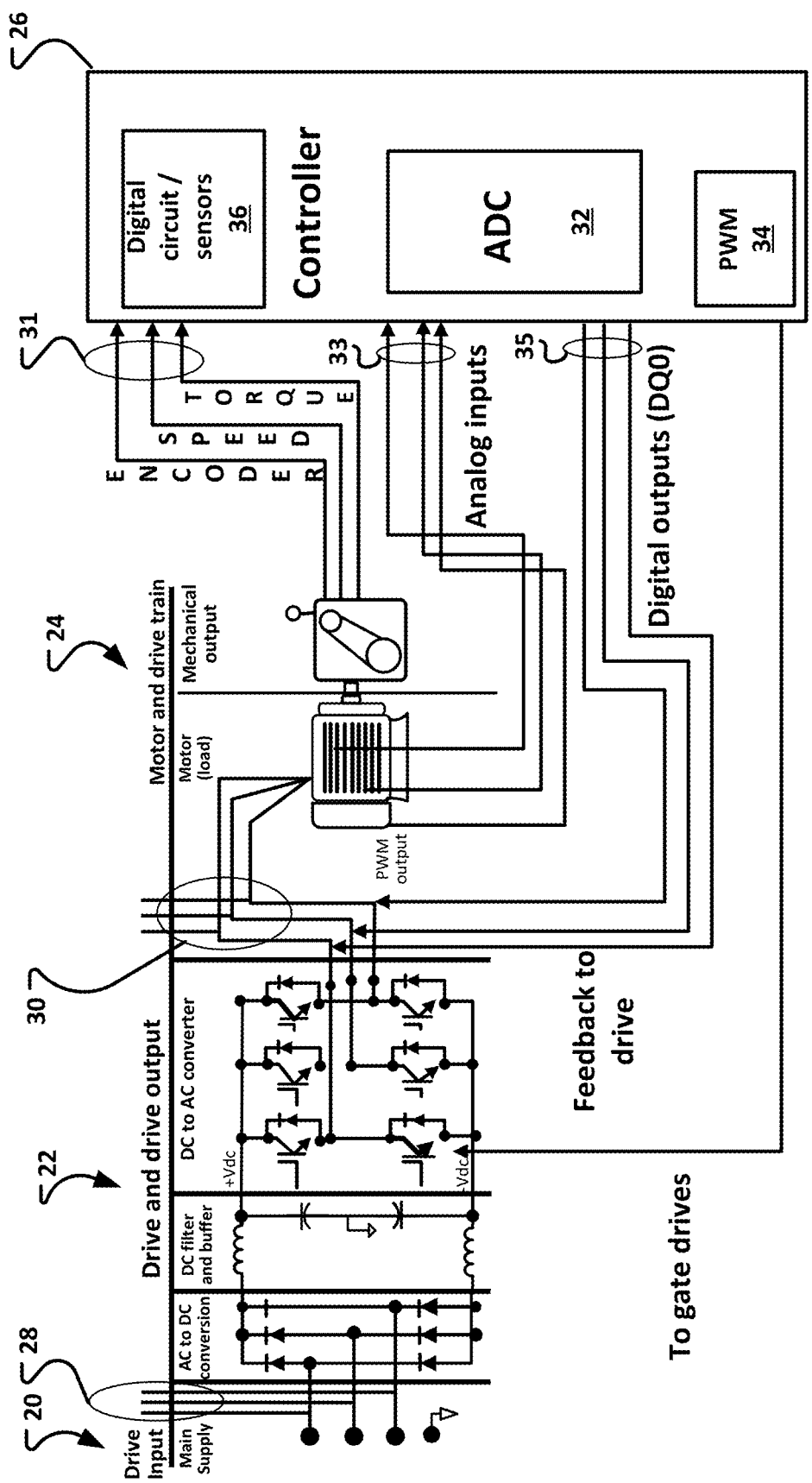
FIG. 2 shows a diagram of an embodiment of a system including a device under test.

FIG. 2 shows an embodiment of a system in which the device under test is a motor and drive train 24 being controlled by an embedded controller 26. The motor receives power inputs from the main AC supply at the drive input 20. In the drive and drive output 22, these signals then undergo AC-to-DC conversion, and DC filtering and buffering. These filtered and buffer signals are then converted back to AC and reach the motor and drive train 24.

In a typical system, the designers could theoretically attempt to sample, e.g., the encoder, speed, and torque signals 31 that reach the motor controller 26, or the analog input signals 33 to the motor controller 26. However, this approach is impractical because it is extremely difficult to physically reach these signal access points with a probe. Therefore, rather than trying to reach these signal access points, a typical approach involves providing an external stimulus to the controller, measuring the controller input signals, and capturing the output of the analog-to-digital converter (ADC) 32 in the controller. However, as previously mentioned, this typical approach also involves using an FPGA to produce the stimulated signals, and sensors to capture the data, e.g. in digital circuit/sensor block 36. Furthermore, the signals received merely comprise "stimulated" signals, rather than actual in-circuit signals while the circuit operates.

In contrast, the embodiments here capture the actual in-circuit signals and allow the controller to generate the DQ0 transformed signals from these signals. The embodiments provide more accurate signal measurements and a much less complex solution by having the controller operate on the in-circuit signals. The system captures these signals using connections at either the drive input, as shown at 28, or at the output of the drive and drive output 22, as shown at 30. In either case, these signals will comprise analog three-phase signals (R, S, T). Either or both voltage and current three-phase signals may be captured by using, for example, appropriate voltage probes and current probes, respectively. The controller 26 receives the analog three-phase signals 33. The controller then executes instructions to calculate the DQ0 transformation discussed above, using the forward equation. One can apply the transformation equations to the voltage and current three-phase signals separately and get the DQ0 for voltage and the DQ0 for current. The DQ0 signals 35 can be provided back to the device under test as feedback. The three-phase analog signals at 30 include this feedback. As understood by those skilled in the art, the controller 26 may also include a PWM circuit 34, providing gate drive signals to the drive and drive output 22, as shown.

Figure 3:
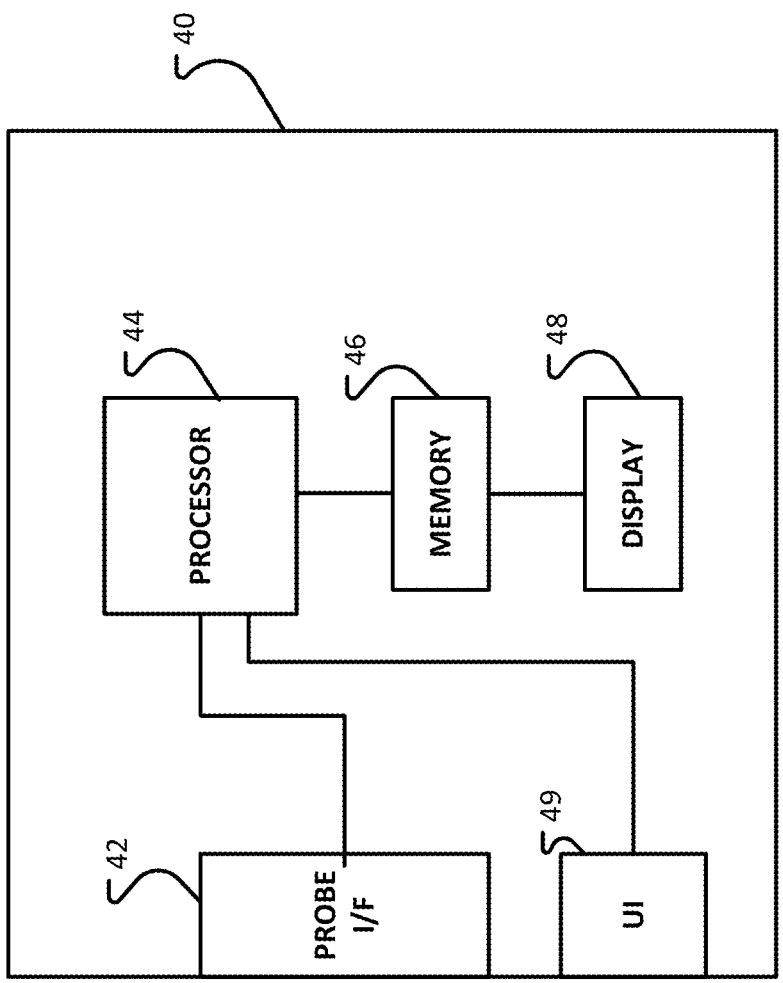
FIG. 3 shows a block diagram of an embodiment of a test and measurement device.

FIG. 3 shows a block diagram of a test and measurement device 40 that receives as inputs, and acquires, the analog three-phase signals through an interface 42, such as a probe interface, as shown. Typically, the probe interface may be one or more connectors to a cable. The interface 42 includes appropriate circuitry (not shown) for acquiring the three-phase signals, which may include signal conditioning circuitry, analog-to-digital converters, memories, etc., as known to those skilled in the art. The processor/controller/processing element 44 performs the DQ0 transformation and produces DQ0 signals based on the acquired three-phase signals. The processor 44 measures performance of the device under test based on the DQ0 signals. The processor 44 may also perform an inverse DQ0 transformation and produce reconstructed three-phase signals based on DQ0 signals. The device may also include a memory 46 for storing both instructions executed by the processor to cause it to perform the transformations, and for storing data. The device may also include a display 48 to allow the device to display the data, as discussed below. The device may also include a user interface 49 for receiving configuration settings from a user. For example, the device may receive from a user, through the user interface 49, a selection of a method to be used for computing the angle θ at time t in the matrix equations, as discussed above.

The measurement allows configuration for initial alignment of Phase A with the d-axis or with the q-axis. A user can see the change in the output results and Phasor plot based on the configuration.

Figure 4:
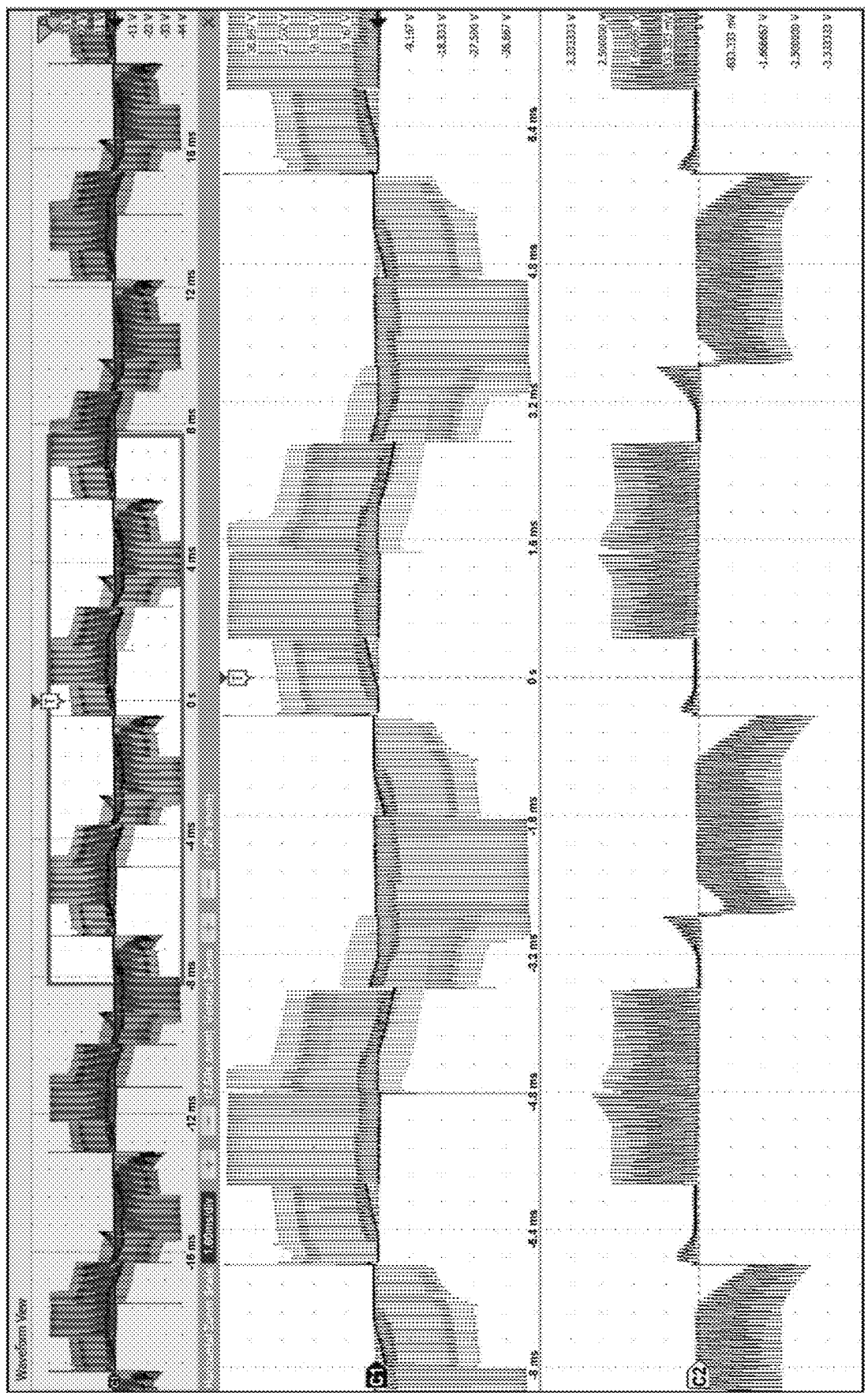
FIG. 4 shows a graphical depiction of three-phase voltage and current signals.

FIGS. 4-12 show graphical depictions of signals as captured by an oscilloscope or other test and measurement device, such as the test and measurement device 40 of FIG. 3. FIG. 4 shows a snapshot of three-phase RST voltage and current signals captured from a brushless DC motor device under test. One should note that the brushless DC motor of these examples merely provides examples of the input and resulting signals and no limitation to that particular device under test.

Figure 5:
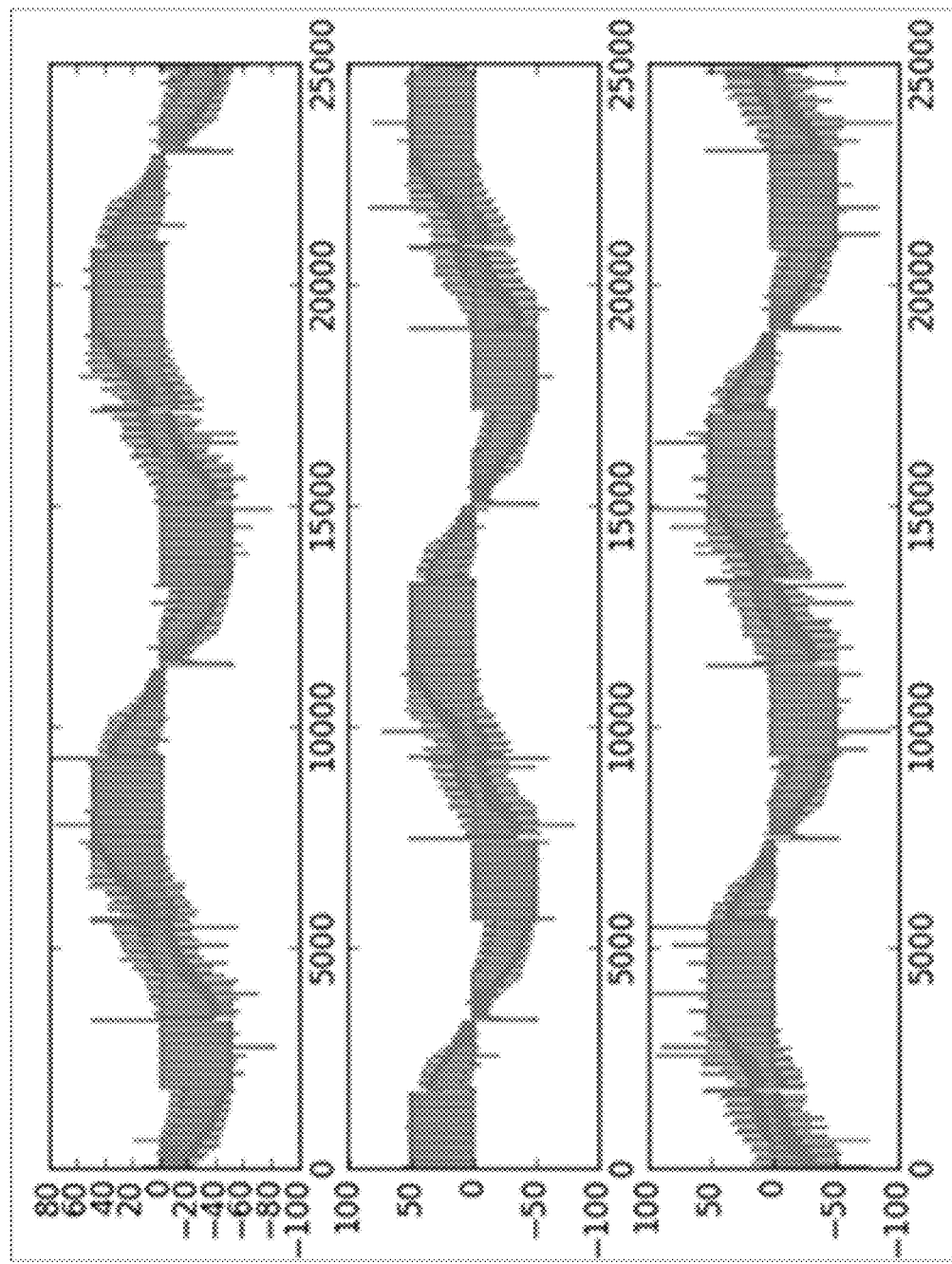
FIG. 5 shows a graphical depiction of three-phase voltage signals with two cycles.
Figure 6:
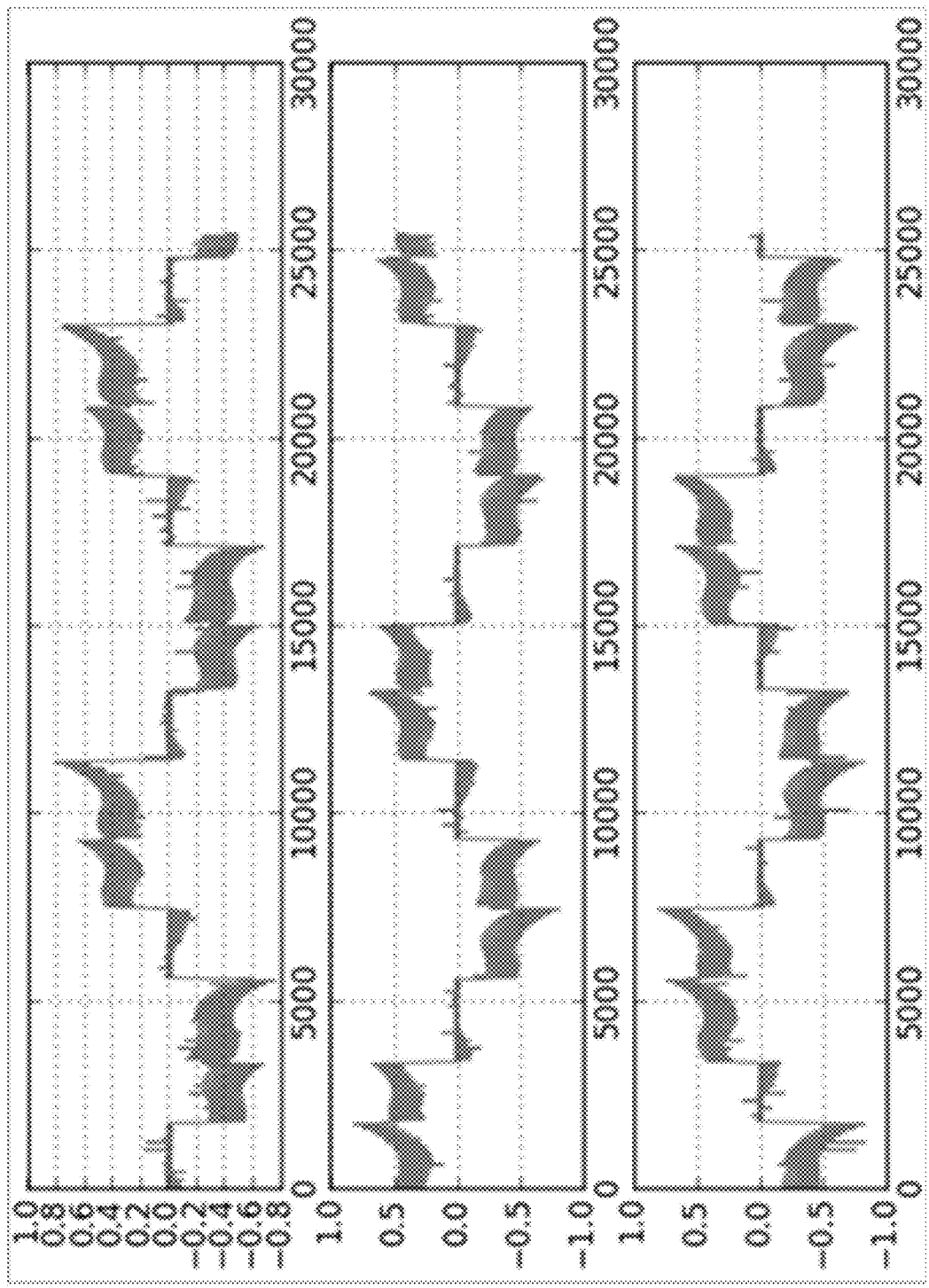
FIG. 6 shows a graphical depiction of three-phase current signals with two cycles.

The separate three-phase voltage RST signals are shown in FIG. 5 and the three-phase current RST signals are shown in FIG. 6.

Figure 7:
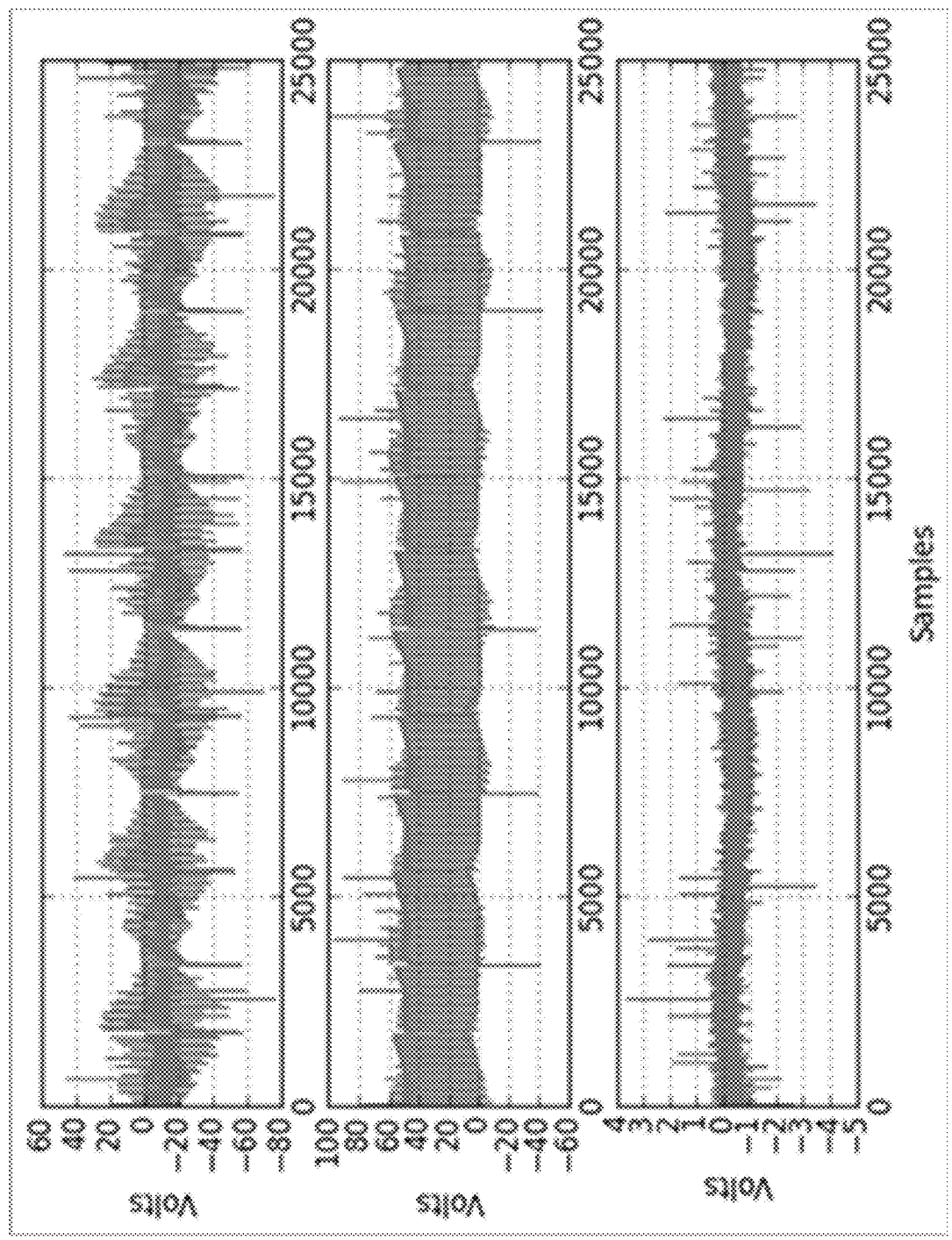
FIG. 7 shows a graphical depiction of DQ0 transformation of three-phase voltage signals, according to embodiments of the present disclosure.
Figure 8:
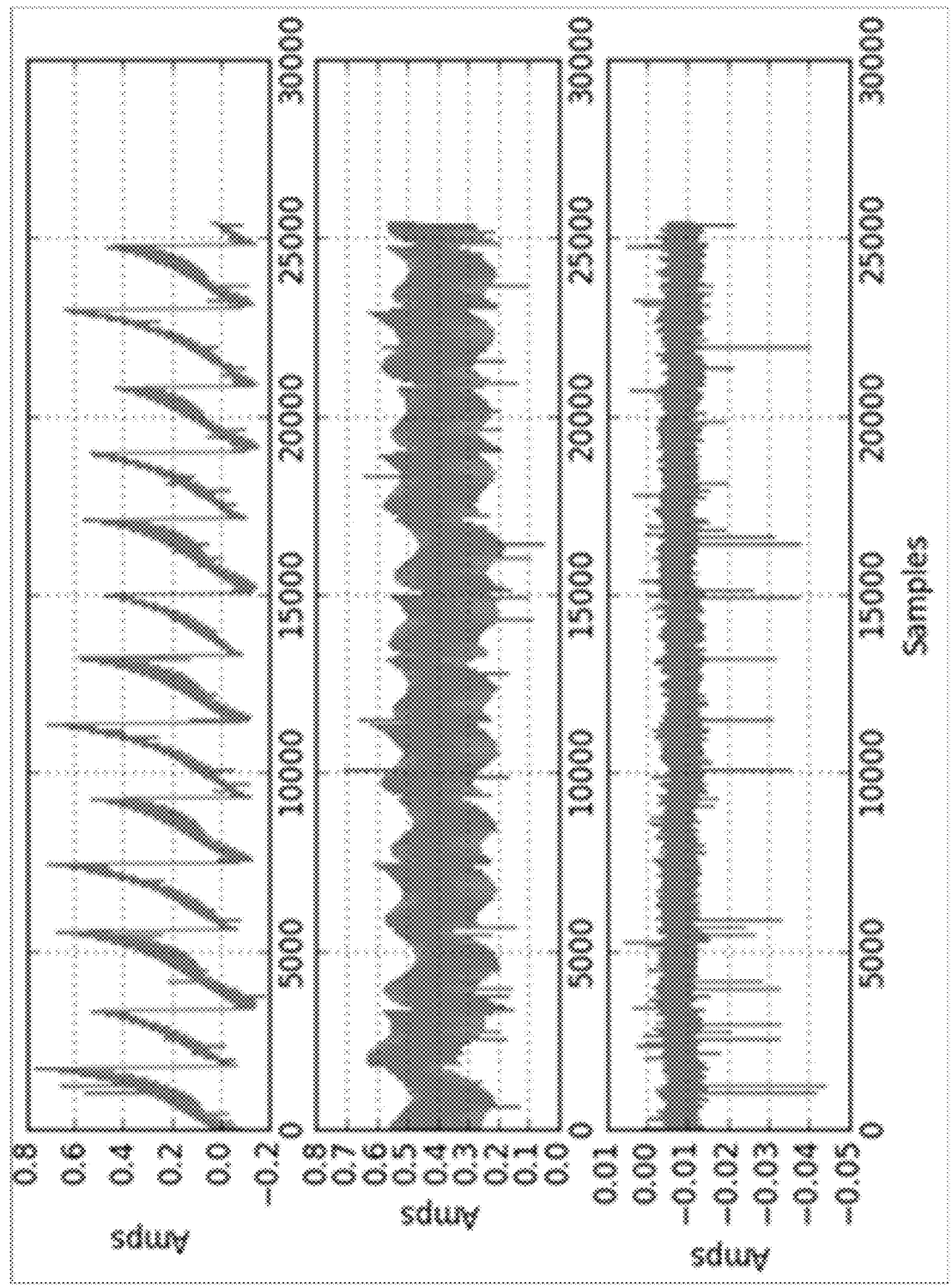
FIG. 8 shows a graphical depiction of DQ0 transformation of three-phase current signals, according to embodiments of the present disclosure.

Applying the forward DQ0 transform results in the voltage waveforms shown in FIG. 7 and the current waveforms shown in FIG. 8.

Figure 9:
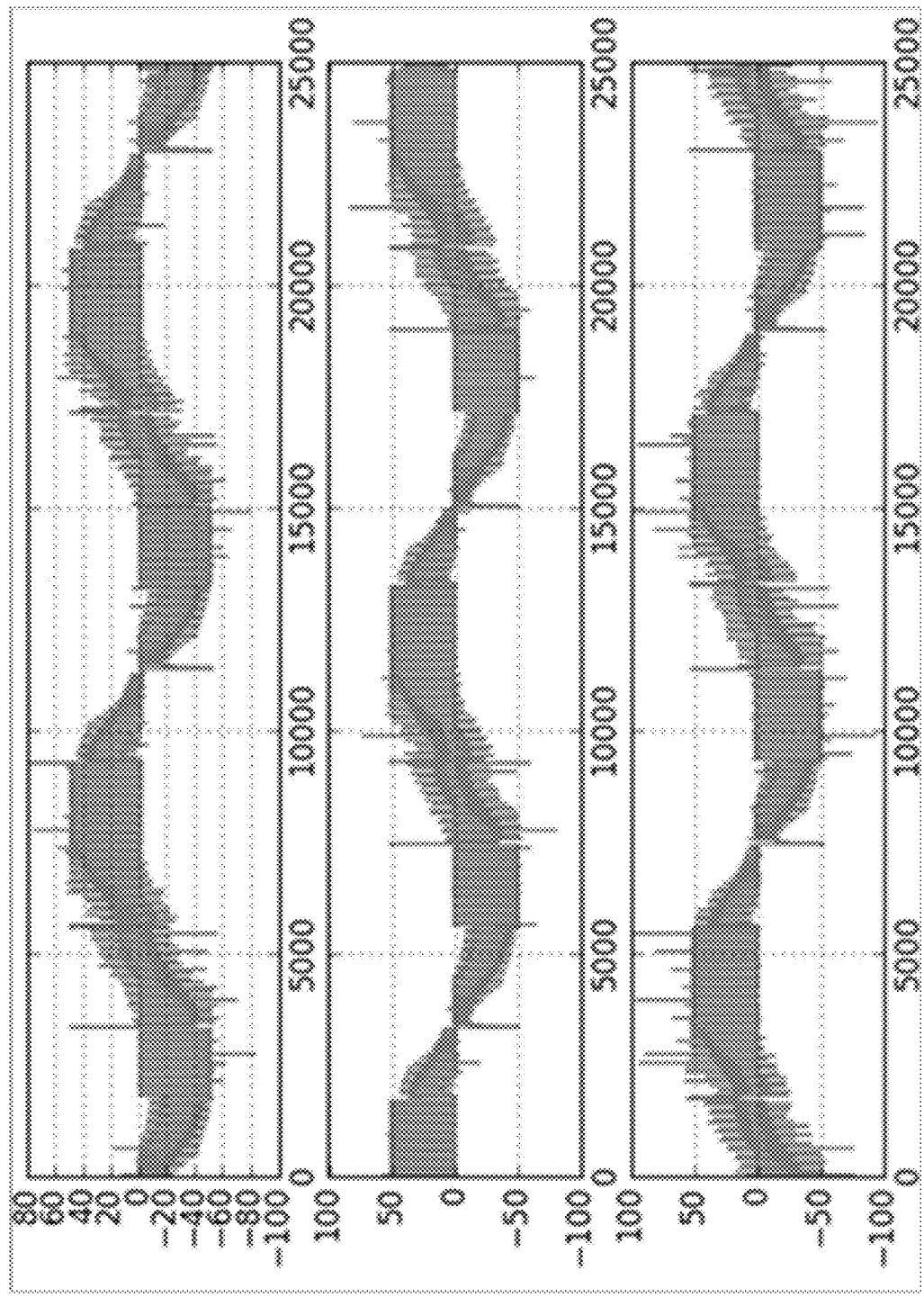
FIG. 9 shows a graphical depiction of an inverse DQ0 transformation to get reconstructed three-phase voltage signals, according to embodiments of the present disclosure.
Figure 10:
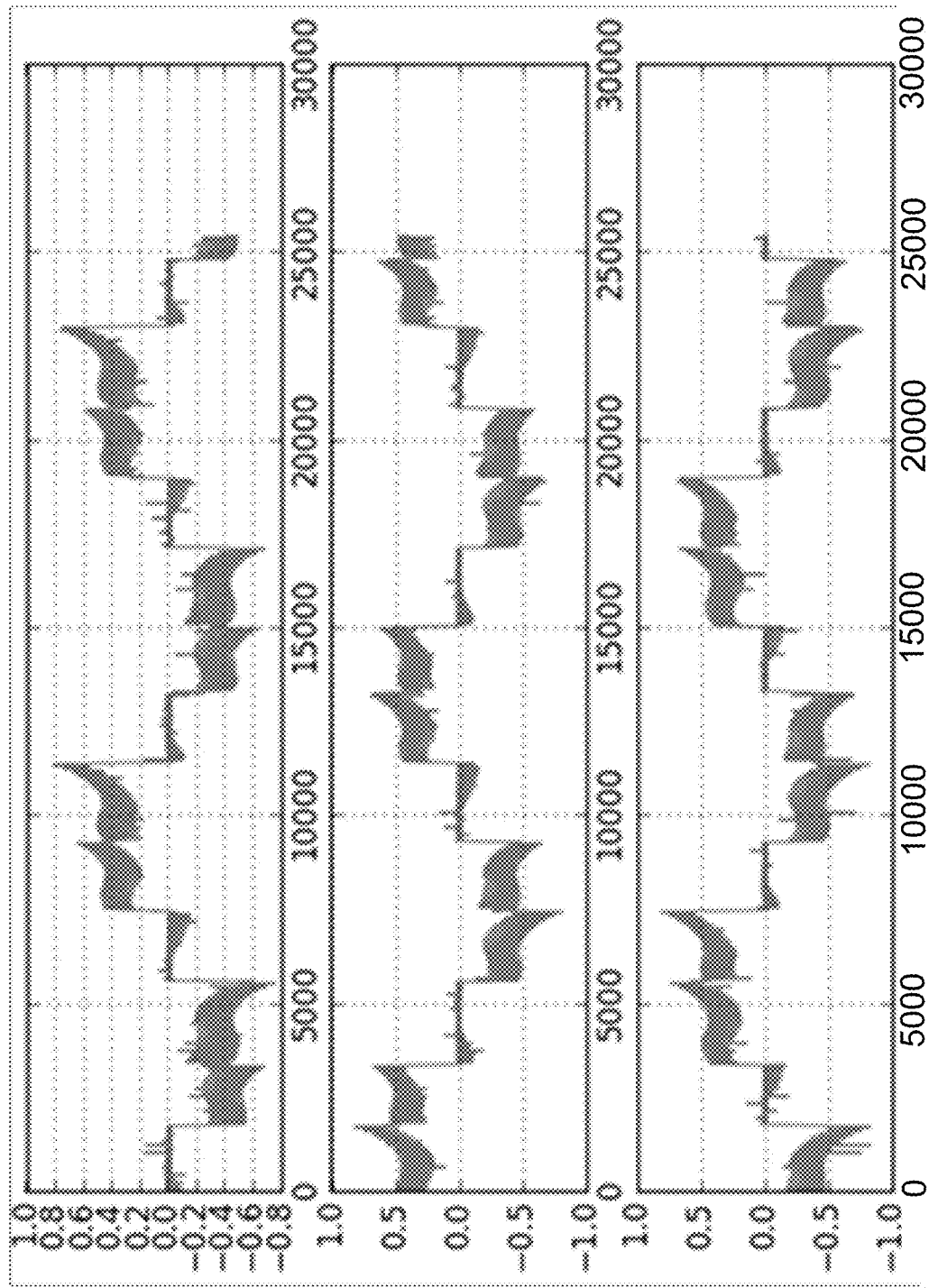
FIG. 10 shows a graphical depiction of an inverse DQ0 transformation to get reconstructed three-phase current signals, according to embodiments of the present disclosure.

Application of the backwards, inverse DQ0 transform results in the three-phase waveforms shown in FIG. 9 and FIG. 10. FIG. 9 can be compared to FIG. 5, and FIG. 10 can be compared to FIG. 6, as a check to the accuracy of the transforms. Usually, however, the user will want to see the inverse transform to monitor performance of the controller 26.

As discussed previously, the three-phase signals vary in time, which means that no steady state operation point exists. Referring back to FIG. 1, it shows the three rotor axes 10, 12, 14, one for each phase a 10, phase b 12, and phase c 14. In an induction machine, the d-axis is assumed to align on the a-axis at t=0 and rotate with synchronous speed (w). The DQ0 transformation results in the elimination of all time-varying inductances in the three-phase voltage and current signals as shown in FIG. 11.

Figure 11:
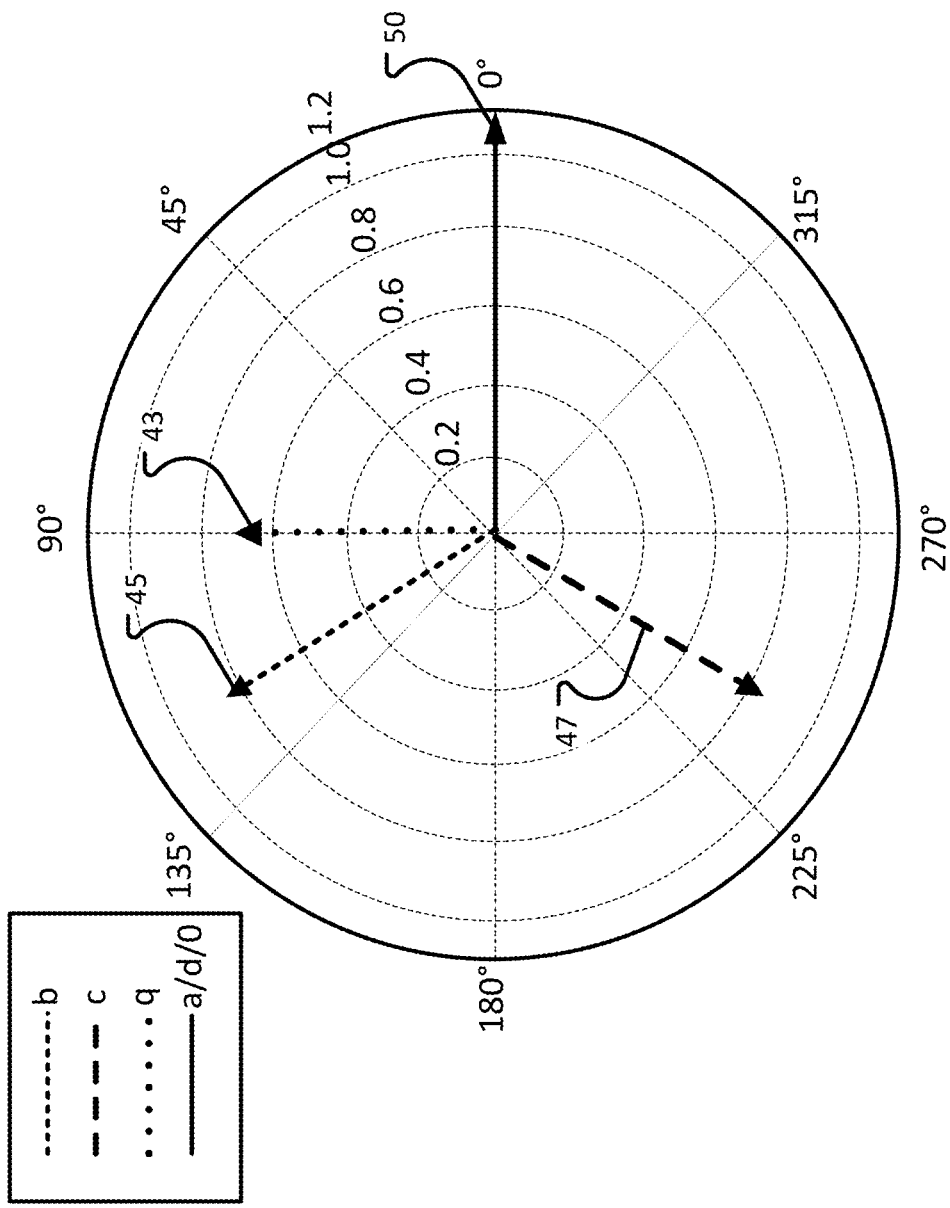
FIG. 11 shows a phasor diagram of three-phase voltage RST and DQ0 transformations at time t=0, according to embodiments of the present disclosure.

In FIG. 11, the rotating reference showing overlapped vectors of the three-phase RST and DQ0 components at time t=0. The a-axis and d-axis overlap at the 0 axis at 50. The b-axis is shown at 45. The c-axis is at 47, and the q-axis is at 43.

Figure 12:
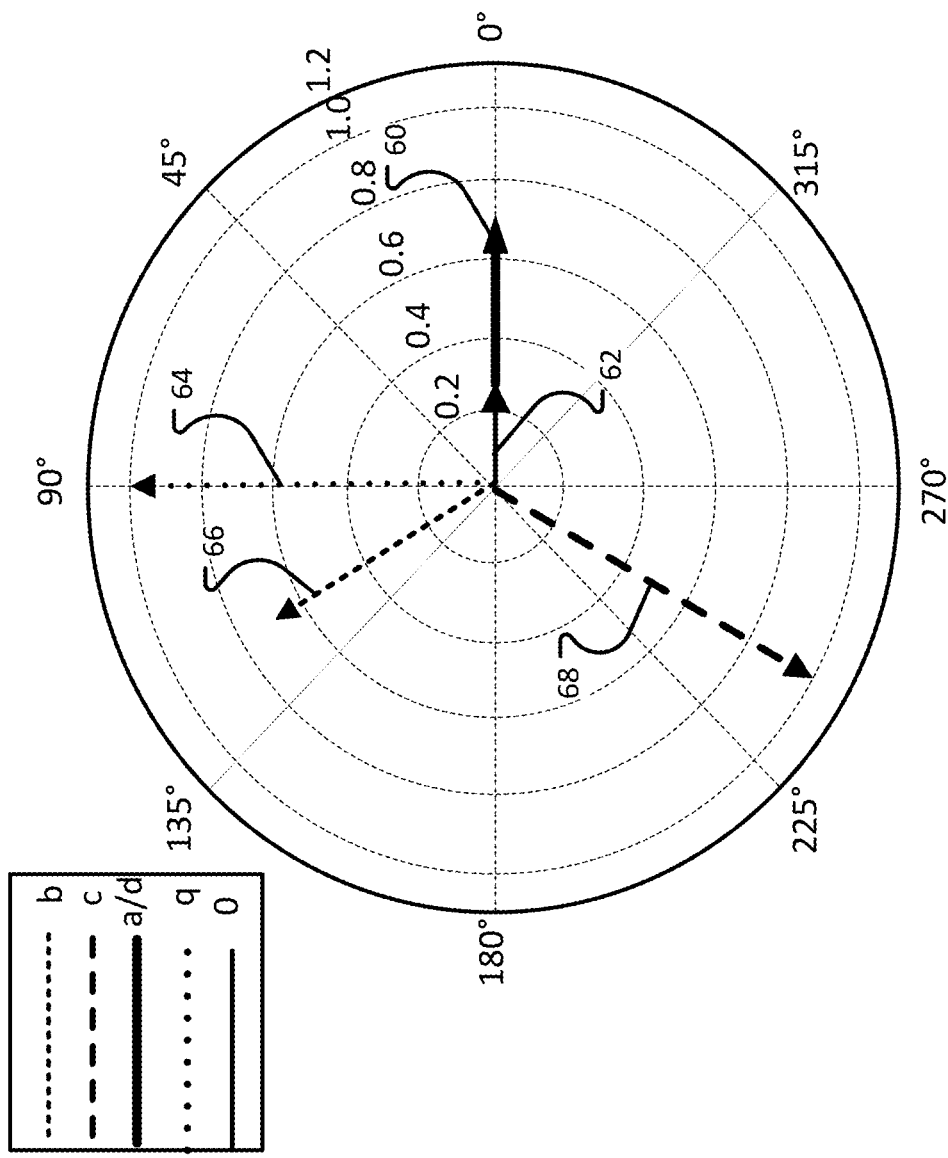
FIG. 12 shows a phasor diagram of three-phase voltage RST and DQ0 transformations, according to embodiments of the present disclosure.

In FIG. 12, the rotating frame vector shows the d- and q-axes varying for each sample time. The zero axis is fixed at 62, with the a-axis and the d-axis overlapping at 60. The q-axis is at 64, the b-axis is at 66, and the c-axis is at 68. The sample rate has been simulated to show the rotating part, although in an actual plot the rate can be much slower. This is an indicative example of the rotating vectors.

Figure 16:
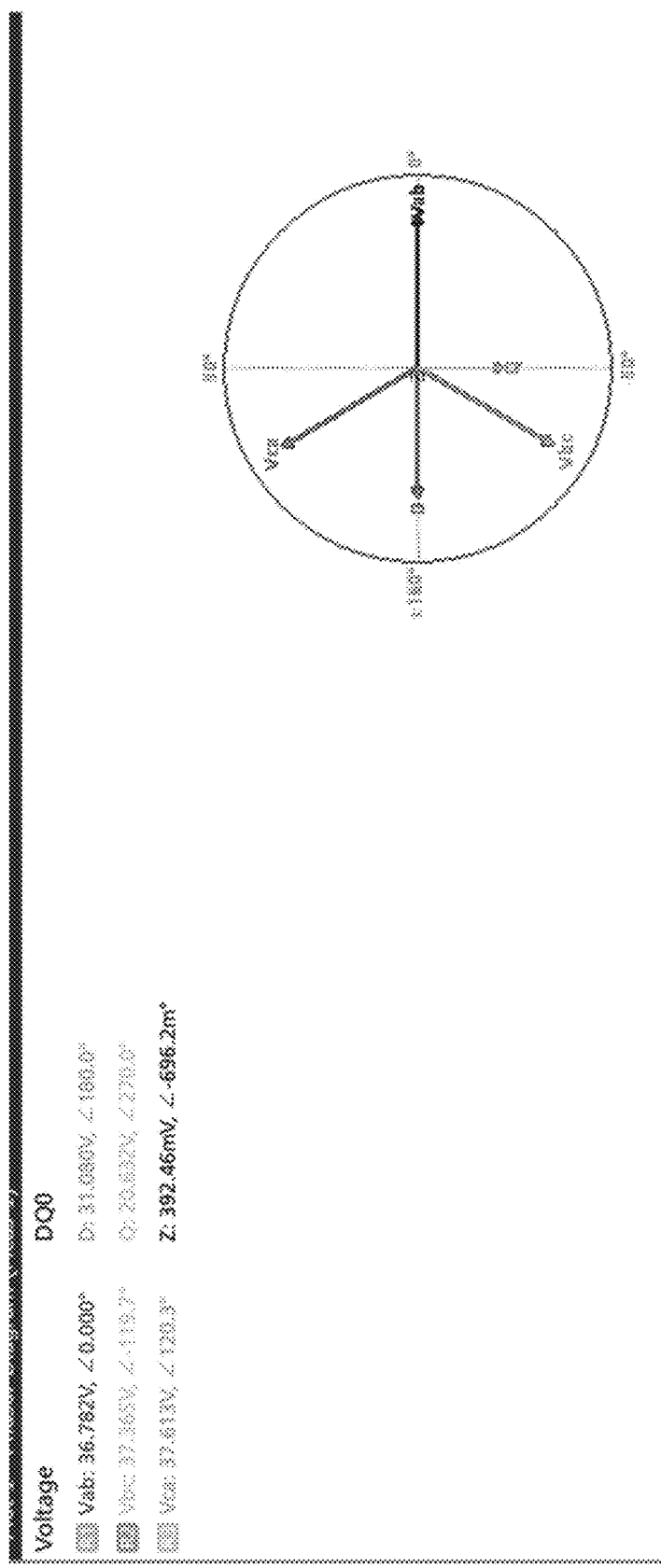
FIG. 16 shows an example of a phasor diagram of actual three phase signals overlapped with rotating DQ0 signals, according to some embodiments of the present disclosure.
Figure 17:
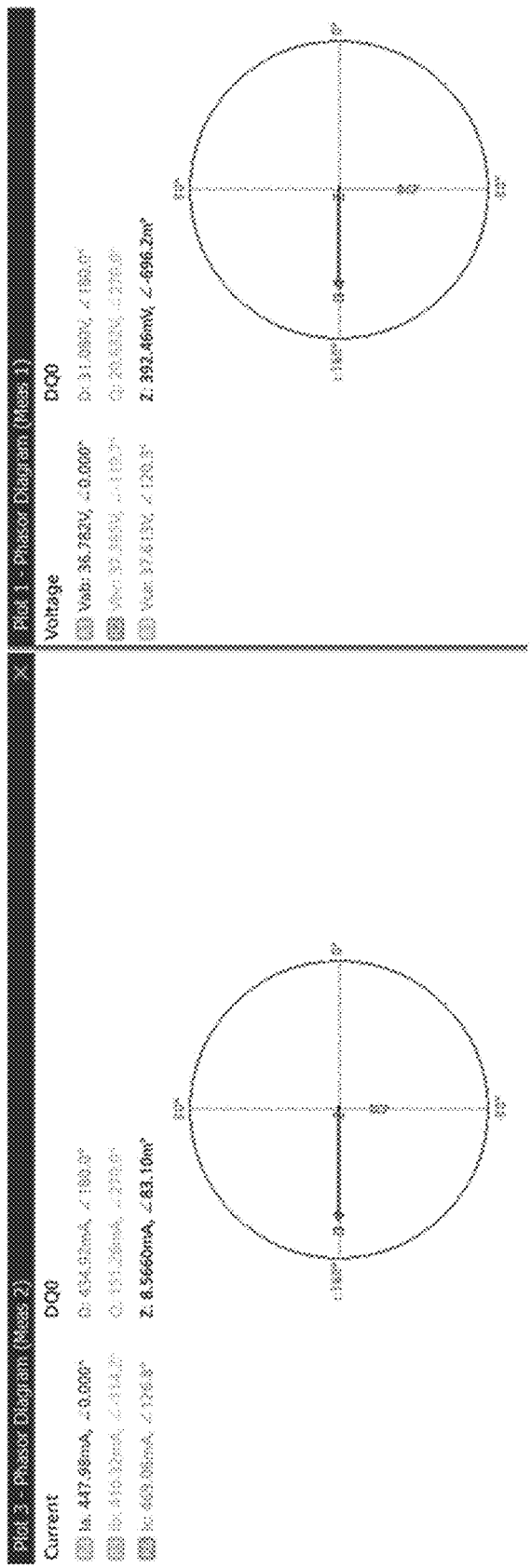
FIG. 17 shows an example of separate phasor diagrams for actual Voltage and Current DQ0 signals, according to some embodiments of the present disclosure.

FIGS. 16 and 17 show actual rotating frames of an actual DQ0 phasor plot. The plot update rate is equivalent to product of the frequency of the 3-phase RST signals and number of such cycles in the acquisition.

Figure 18:
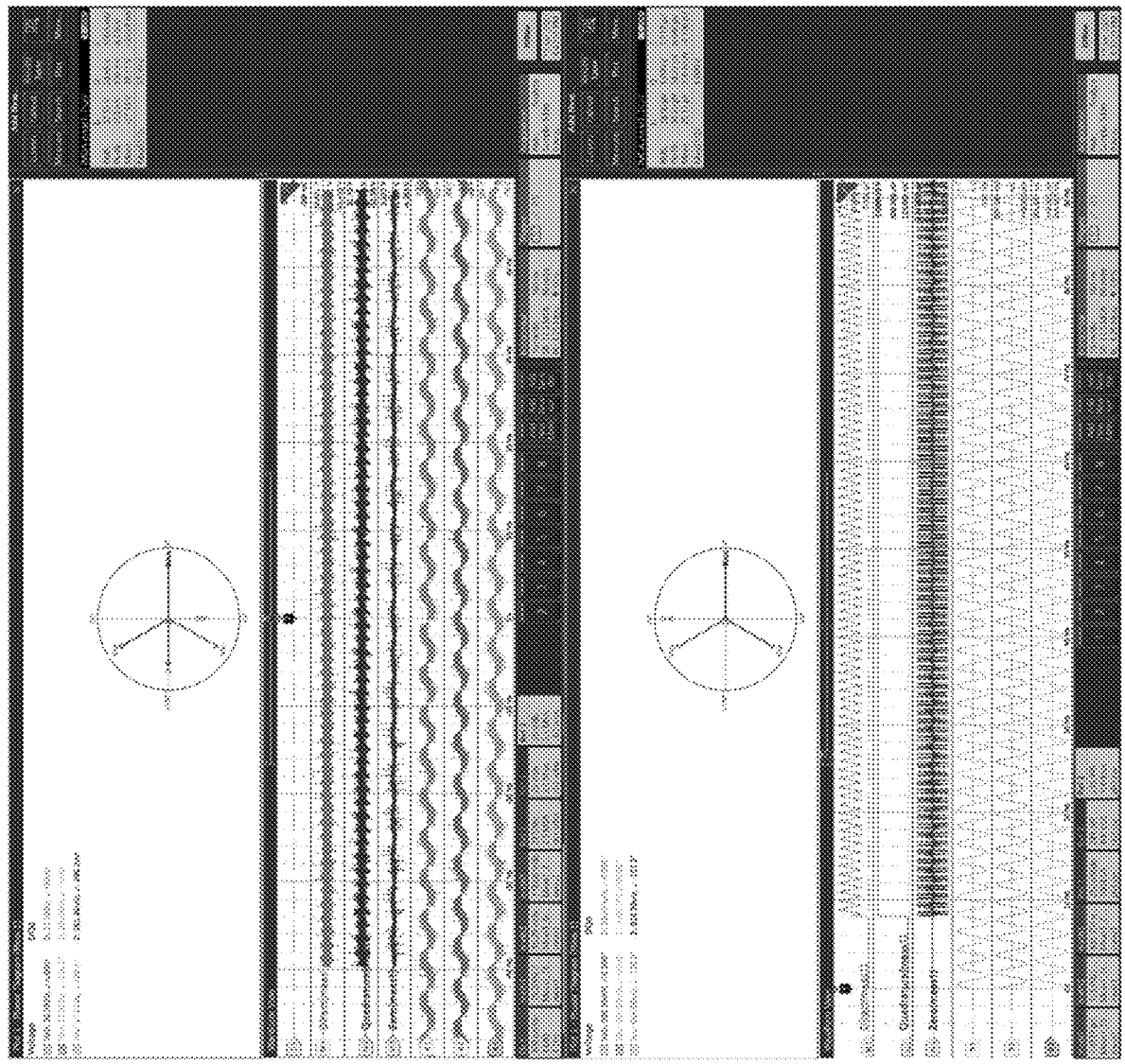
FIG. 18 shows examples of actual Results and Phasor plots of Math DQ0 with the time domain three phase sinusoidal and PWM waveforms, according to embodiments of the present disclosure.

FIG. 18 shows examples of actual Results and Phasor plot of Math DQ0 with the time domain three phase sinusoidal and PWM waveforms with Q as DC and D going to zero as D is aligned with Phase A initially. If Phase A is aligned to Q initially then the D will be DC and Q will be going to zero.

Figure 13:
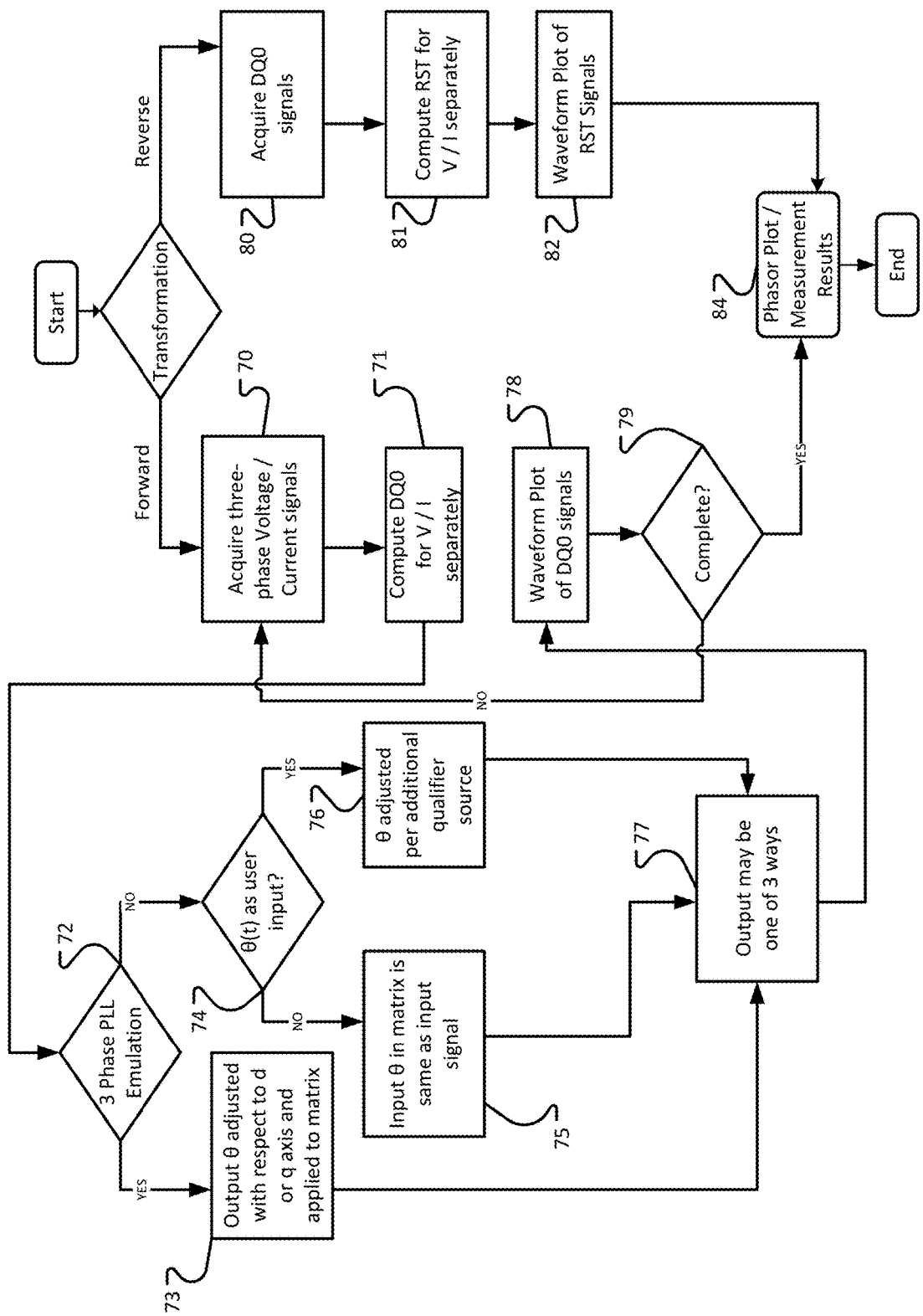
FIG. 13 shows a flowchart of a method to measure performance of a device under test using DQ0 signals, according to embodiments of the present disclosure.

FIG. 13 shows a flowchart of one embodiment of a method of applying a forward transform and a reverse transform. The method starts at 70 for the forward transform, where the system acquires analog three-phase signals. The system can acquire either or both voltage and current analog three-phase signals. At 71, the DQ0 transform is computed using the acquired analog three-phase signals. The system can compute the DQ0 transforms for the voltage and current separately at 71.

The three-phase PLL emulation that begins at 72 shows the three different methods discussed above. If the three-phase PLL emulation is applied then the output θ is adjusted with respect to the d or q axis and applied to the matrix equations at 73. If the answer at 72 is "NO" then at 74, θ is then either used as a user input or not. If it is not, the process continues to the freewheeling method at 75 where the input θ is the same as the input signal. If θ is used as the user input, it is further adjusted per an additional qualifier source at 76. At 77, the output is selected as one of the three ways discussed above. These are then returned to 78.

The device can then display a waveform plot of the DQ0 signals at 78. This allows the designers to see what the controller sees so they can adjust the performance of the device under test as needed. In addition, the system can measure the performance of the device under test based on the DQ0 signals as desired by the system designers. These performance measurements include ripple (rms—root mean square), peak-peak amplitude, the DC average of the DQ0 components, Magnitude (D,Q), the Fast Fourier Transform plot of the DQ0 components, and the total power of DQ0. The user can perform a harmonics measurement and jitter analysis after the DQ0 transformation. Since DQ0 is expected to have DC components, whatever variations comes out in magnitude will contribute to higher order harmonics and jitter. At 79, the process continues until all of the samples are processed. If the process is complete it goes to 84, if the process is not complete it returns to 70.

Figure 15:
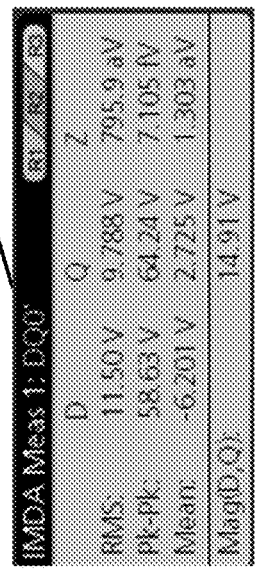
FIG. 15 shows an example embodiment of a user interface to display results, according to some embodiments of the present disclosure.
Figure 14:
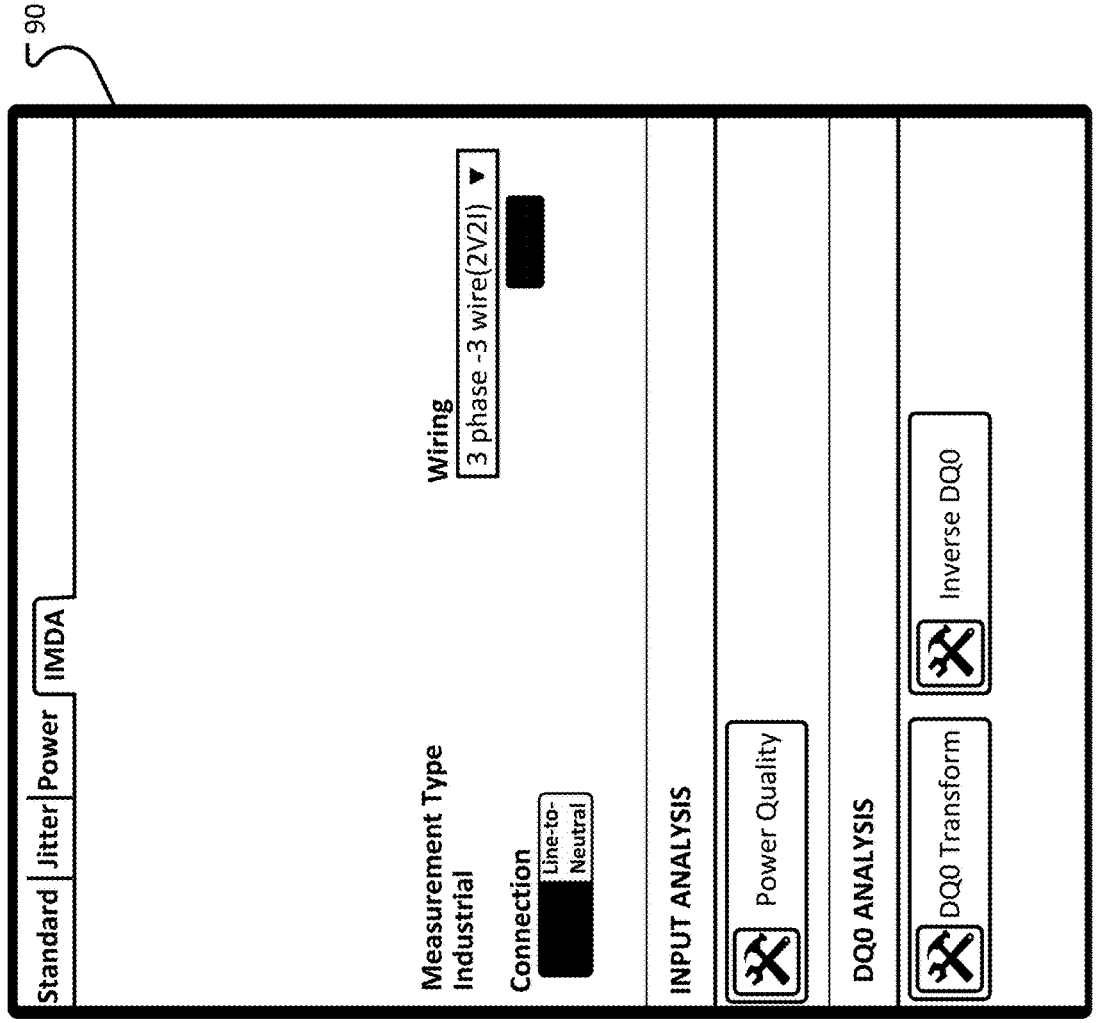
FIG. 14 shows an example embodiment of a user interface to receive configuration settings from a user, according to some embodiments of the present disclosure.

FIG. 14 shows an example of a user interface 90 that allows the system designers to select configuration settings for the measurements they want to run on the device under test. FIG. 15 shows an example of a user interface 92 for displaying the measurement results. The results shown here are three-phase voltages for the DQ0 signals, peak-peak amplitudes, means, and Magnitude (D,Q), but could be any measurement of interest, such a measurement selected from harmonics measurements, jitter analysis, or another one. Example user interfaces 90 and 92 may be part of user interface 49 of the test and measurement device 40 in FIG. 3.

Returning to FIG. 13, the inverse/reverse/backwards transform process starts when the DQ0 controller signals are acquired at 80. The system may acquire either or both voltage and current DQ0 signals. At 81, the inverse DQ0 transform is computed and reconstructed three-phase RST signals are produced based on the DQ0 signals. The system can compute the reconstructed three-phase RST signals for the voltage and current separately at 81. The system can generate a waveform plot of the reconstructed three-phase signals at 82. This allows, for example, the system designers to compare the reconstructed three-phase signals from the inverse transform to the analog three-phase RST signals acquired at 70, in order to monitor system performance. At 84, in either the forward or the reverse transform process, the system may also generate and display a phasor plot of one or more signals, or measurement results based on one or more signals. Typically, the DQ0 signals may be acquired, i.e. received, from the output of 71. However, in some embodiments, the DQ0 signals may be acquired from an external source, such as through interface 42 of the test and measurement device 40 of FIG. 3, in which case only the inverse transformation may need to be performed.

Aspects of the disclosure may operate on a particularly created hardware, on firmware, digital signal processors, or on a specially programmed general-purpose computer including a processor operating according to programmed instructions. The terms controller or processor as used herein are intended to include microprocessors, microcomputers, Application Specific Integrated Circuits (ASICs), and dedicated hardware controllers. One or more aspects of the disclosure may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a non-transitory computer readable medium such as a hard disk, optical disk, removable storage media, solid-state memory, Random Access Memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGA, and the like. Particular data structures may be used more effectively to implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or non-transitory computer-readable media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include RAM, ROM, Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

Communication media means any media that can be used for the communication of computer-readable information. By way of example, and not limitation, communication media may include coaxial cables, fiber-optic cables, air, or any other media suitable for the communication of electrical, optical, Radio Frequency (RF), infrared, acoustic or other types of signals.

Additionally, this written description makes reference to particular features. It is to be understood that the disclosure in this specification includes all possible combinations of those particular features. For example, where a particular feature is disclosed in the context of a particular aspect, that feature can also be used, to the extent possible, in the context of other aspects.

Also, when reference is made in this application to a method having two or more defined steps or operations, the defined steps or operations can be carried out in any order or simultaneously, unless the context excludes those possibilities.

Although specific aspects of the disclosure have been illustrated and described for purposes of illustration, it will be understood that various modifications may be made without departing from the spirit and scope of the disclosure. Accordingly, the disclosure should not be limited except as by the appended claims.

EXAMPLES

Illustrative examples of the disclosed technologies are provided below. An embodiment of the technologies may include one or more, and any combination of, the examples described below.

Example 1 is test and measurement device, comprising an interface configured to acquire analog three-phase signals from a device under test; and a processor programmed to execute instructions that cause the processor to: perform a direct-quadrature-zero, DQ0, transformation and produce DQ0 signals based on the analog three-phase signals; and measure performance of the device under test based on the DQ0 signals.

Example 2 is the test and measurement device of Example 1, wherein measuring performance of the device under test based on the DQ0 signals comprises measuring at least one of ripple, peak-to-peak amplitude, DC average of DQ0 components, Fast Fourier Transform plot of DQ0 component, magnitude of D and Q, harmonics measurement, jitter analysis, and total power of DQ0.

Example 3 is the test and measurement device of either of Examples 1 and 2, further comprising a display, wherein the processor is programmed to execute instructions that cause the processor to display the DQ0 signals on the display.

Example 4 is the test and measurement device of any of Examples 1 through 3, wherein the processor is programmed to execute instructions that cause the processor to perform an inverse DQ0 transformation and produce reconstructed three-phase signals based on the DQ0 signals.

Example 5 is the test and measurement device of Example 4, further comprising a display, wherein the processor is programmed to execute instructions that cause the processor to display the reconstructed three-phase signals on the display.

Example 6 is the test and measurement device of Example 4, wherein the processor is programmed to execute instructions that cause the processor to generate a phasor diagram using at least one of the analog three-phase signals, the DQ0 signals, and the reconstructed three-phase signals.

Example 7 is the test and measurement device of any of Examples 1 through 6, wherein the interface is configured to receive the analog three-phase signals from a motor drive input or drive output of the device under test.

Example 8 is the test and measurement device of any of Examples 1 through 7, wherein the interface is configured to receive analog three-phase voltage signals via voltage probes and analog three-phase current signals via current probes.

Example 9 is the test and measurement device of any of Examples 1 through 8, further comprising a display, wherein the processor is programmed to execute instructions that cause the processor to generate a phasor diagram using the analog three-phase signals and the DQ0 signals, and to display the phasor diagram on the display.

Example 10 is the test and measurement device of any of Examples 1 through 9, wherein the DQ0 transformation uses a constant that equals either two-thirds or square root of two-thirds.

Example 11 is a method, comprising: acquiring three-phase signals from a device under test; performing a direct-quadrature-zero, DQ0, transformation on the three-phase signals to produce DQ0 signals; and using the DQ0 signals to measure performance of the device under test.

Example 12 is the method of Example 11, further comprising generating a plot of the DQ0 signals.

Example 13 is the method of either of Examples 11 or 12, wherein using the DQ0 signals to measure performance of the device under test comprises measuring at least one of ripple, peak-peak amplitude, DC average of the DQ0 components, Fast Fourier Transform of the DQ0 signals, magnitude of D and Q, harmonics measurement, jitter analysis, and total power of the DQ0.

Example 14 is the method of any of Examples 11 through 13, wherein acquiring three-phase signals from the device under test comprises receiving the three-phase signals from a motor drive input or drive output of the device under test.

Example 15 is the method of any of Examples 11 through 14, further comprising: generating a phasor diagram using the acquired three-phase signals and the DQ0 signals; and displaying the phasor diagram.

Example 16 is the method of any of Examples 11 through 15, wherein acquiring three-phase signals from the device under test comprises receiving three-phase voltage signals and receiving three-phase current signals from the device under test, and wherein performing the DQ0 transformation comprises performing the DQ0 transformation on the three-phase voltage signals and the three-phase current signals separately.

Example 17 is the method of any of Examples 11 through 16, wherein the DQ0 transformation uses a constant that equals either two-thirds or square root of two-thirds.

Example 18 is the method of any of Examples 11 through 17, further comprising performing an inverse DQ0 transformation on the DQ0 signals to produce reconstructed three-phase signals.

Example 19 is the method of Example 18, further comprising generating a plot of the reconstructed three-phase signals.

Example 20 is the method of Example 18, further comprising: generating a phasor diagram using the DQ0 signals and the reconstructed three-phase signals; and displaying the phasor diagram.

Although specific embodiments have been illustrated and described for purposes of illustration, it will be understood that various modifications may be made without departing from the spirit and scope of the disclosure. Accordingly, the invention should not be limited except as by the appended claims.

The invention claimed is:

1. A test and measurement device, comprising:
   an interface configured to acquire time-varying analog three-phase signals from a device under test, the device under test including a rotor rotating with respect to a stator when the analog three-phase signals are acquired;
   a processor programmed to execute instructions that cause the processor to:
      perform a direct-quadrature-zero, DQ0, transformation and produce DQ0 signals based on the analog three-phase signals, wherein the DQ0 transformation is performed for every sample point of the acquired analog three-phase signals; and
      measure performance of the device under test based on the DQ0 signals; and
   a display, wherein the processor is programmed to execute instructions that cause the processor to generate a phasor diagram using the DQ0 signals, and to display the phasor diagram on the display;
   wherein the processor is programmed to execute instructions that cause the processor to update the phasor diagram on the display over time, for every sample point of the acquired analog three-phase signals as the analog three-phase signals are acquired.

2. The test and measurement device as claimed in claim 1, wherein measuring performance of the device under test based on the DQ0 signals comprises measuring at least one of ripple, peak-to-peak amplitude, DC average of DQ0 components, Fast Fourier Transform plot of DQ0 component, magnitude of D and Q, harmonics measurement, jitter analysis, and total power of DQ0.

3. The test and measurement device as claimed in claim 1, wherein the processor is programmed to execute instructions that cause the processor to display a waveform plot of the DQ0 signals on the display.

4. The test and measurement device as claimed in claim 1, wherein the processor is programmed to execute instructions that cause the processor to perform an inverse DQ0 transformation and produce reconstructed three-phase signals based on the DQ0 signals.

5. The test and measurement device as claimed in claim 4, wherein the processor is programmed to execute instructions that cause the processor to display the reconstructed three-phase signals on the display.

6. The test and measurement device as claimed in claim 4, wherein the processor is programmed to execute instructions that cause the processor to generate a phasor diagram using at least one of the analog three-phase signals, and the reconstructed three-phase signals.

7. The test and measurement device as claimed in claim 1, wherein the interface is configured to receive the analog three-phase signals from a motor drive input or drive output of the device under test.

8. The test and measurement device as claimed in claim 1, wherein the interface is configured to receive analog three-phase voltage signals via voltage probes and analog three-phase current signals via current probes.

9. The test and measurement device as claimed in claim 1, wherein the processor is programmed to execute instructions that cause the processor to generate the phasor diagram using the analog three-phase signals and the DQ0 signals, and to display the phasor diagram on the display.

10. The test and measurement device as claimed in claim 1, wherein the DQ0 transformation uses a constant that equals either two-thirds or square root of two-thirds.

11. A method, comprising:
   acquiring time-varying three-phase signals from a device under test, the device under test including a rotor rotating with respect to a stator when the three-phase signals are acquired;
   performing a direct-quadrature-zero, DQ0, transformation on the three-phase signals to produce DQ0 signals, wherein the DQ0 transformation is performed for every sample point of the acquired analog three-phase signals;
   using the DQ0 signals to measure performance of the device under test;
   generating a phasor diagram using the DQ0 signals and displaying the phasor diagram on a display device; and
   updating the phasor diagram on the display device over time, for every sample point of the acquired analog three-phase signals as the analog three-phase signals are acquired.

12. The method as claimed in claim 11, further comprising generating a waveform plot of the DQ0 signals on the display device.

13. The method as claimed in claim 11, wherein using the DQ0 signals to measure performance of the device under test comprises measuring at least one of ripple, peak-peak amplitude, DC average of the DQ0 components, Fast Fourier Transform of the DQ0 signals, magnitude of D and Q, harmonics measurement, jitter analysis, and total power of the DQ0.

14. The method as claimed in claim 11, wherein acquiring three-phase signals from the device under test comprises receiving the three-phase signals from a motor drive input or drive output of the device under test.

15. The method as claimed in claim 11,
   wherein generating the phasor diagram using the DQ0 signals comprises generating the phasor diagram using the acquired three-phase signals and the DQ0 signals.

16. The method as claimed as claimed in claim 11, wherein acquiring three-phase signals from the device under test comprises receiving three-phase voltage signals and receiving three-phase current signals from the device under test, and wherein performing the DQ0 transformation comprises performing the DQ0 transformation on the three-phase voltage signals and the three-phase current signals separately.

17. The method as claimed in claim 11, wherein the DQ0 transformation uses a constant that equals either two-thirds or square root of two-thirds.

18. The method as claimed in claim 11, further comprising performing an inverse DQ0 transformation on the DQ0 signals to produce reconstructed three-phase signals.

19. The method as claimed in claim 18, further comprising generating a plot of the reconstructed three-phase signals on the display device.

20. The method as claimed in claim 18, further comprising:
    wherein generating the phasor diagram using the DQ0 signals comprises generating the phasor diagram using the DQ0 signals and the reconstructed three-phase signals.

* * * * *